United States Patent
Shemesh (10) Patent No.: US 9,104,040 B2
(45) Date of Patent: Aug. 11, 2015

(54) LINE OF SIGHT STABILIZATION SYSTEM

(75) Inventor: Shimon Shemesh, Holon (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 363 days.

(21) Appl. No.: 13/807,147

(22) PCT Filed: Jun. 16, 2011

(86) PCT No.: PCT/IL2011/000480
§ 371 (c)(1),
(2), (4) Date: Mar. 18, 2013

(87) PCT Pub. No.: WO2012/001677
PCT Pub. Date: Jan. 5, 2012

(65) Prior Publication Data
US 2013/0193315 A1 Aug. 1, 2013

(30) Foreign Application Priority Data

Jun. 29, 2010 (IL) .......................................... 206689

(51) Int. Cl.
*H01J 3/14* (2006.01)
*G02B 27/64* (2006.01)
*G01J 1/04* (2006.01)

(52) U.S. Cl.
CPC . *G02B 27/64* (2013.01); *G01J 1/04* (2013.01); *G02B 27/644* (2013.01)

(58) Field of Classification Search
CPC .................................................... G02B 27/644
USPC ........................................................ 250/234
See application file for complete search history.

(56) References Cited

U.S. PATENT DOCUMENTS

| 3,522,993 | A | * | 8/1970 | Gabriet ........................ 356/248 |
| 3,804,496 | A | | 4/1974 | Crane et al. |
| 4,701,602 | A | | 10/1987 | Schaefer et al. |
| 2002/0145102 | A1 | | 10/2002 | Eckelkamp-Baker et al. |
| 2006/0017816 | A1 | | 1/2006 | Gat |
| 2009/0251773 | A1 | * | 10/2009 | Danziger et al. .............. 359/367 |

OTHER PUBLICATIONS

Schwalm et al., "Silicon Carbide Pointing Mirror and Telescope for the Geostationary Imaging Fourier Transform Spectrometer (GIFTS)," *Proceedings of SPIE*, 2005, vol. 5868, pp. 586803-1-586803-8.

* cited by examiner

*Primary Examiner* — Thanh Luu
(74) *Attorney, Agent, or Firm* — Oliff PLC (57) ABSTRACT

An optical system (20) is presented, which is configured to enable the line of sight stabilization. The system comprises a light module (230), an optical module (210) defining an optical axis (0X) and an optical path of light propagation therethrough, and a stabilizer (220) configured and operable for providing optical coupling between said optical module (210) and said light module (230). The stabilizer (2209 comprises: a gimbal assembly defining a first rotation axis (FRX) orthogonal to said optical axis (0X), and an internal deflector (222) located in the optical path of light propagating through said optical module (210). The internal deflector (222) is mounted for rotation about said first rotation axis (FRX) and is configured and operable to provide optical coupling between at least a section of the optical path of said optical module (210) and an optical path of light passing through said light module (230).

21 Claims, 5 Drawing Sheets

Fig. 1A
General Art

Fig. 1B
General Art

LINE OF SIGHT STABILIZATION SYSTEM

FIELD OF THE INVENTION

This invention relates to line of sight stabilization systems and particularly to systems for providing optical coupling between optical modules and light source and/or light detection modules.

BACKGROUND OF THE INVENTION

Line of sight stabilization systems are often used to conjugate and optically couple optical systems such as telescopes with light source modules and/or with light detection modules such as lasers and imagers commonly referred to herein as light modules. Line of sight stabilization systems allow variable orientations of the line of sight of the light modules with respect to the direction of the principal optical axis of the light module.

Figure 1A:
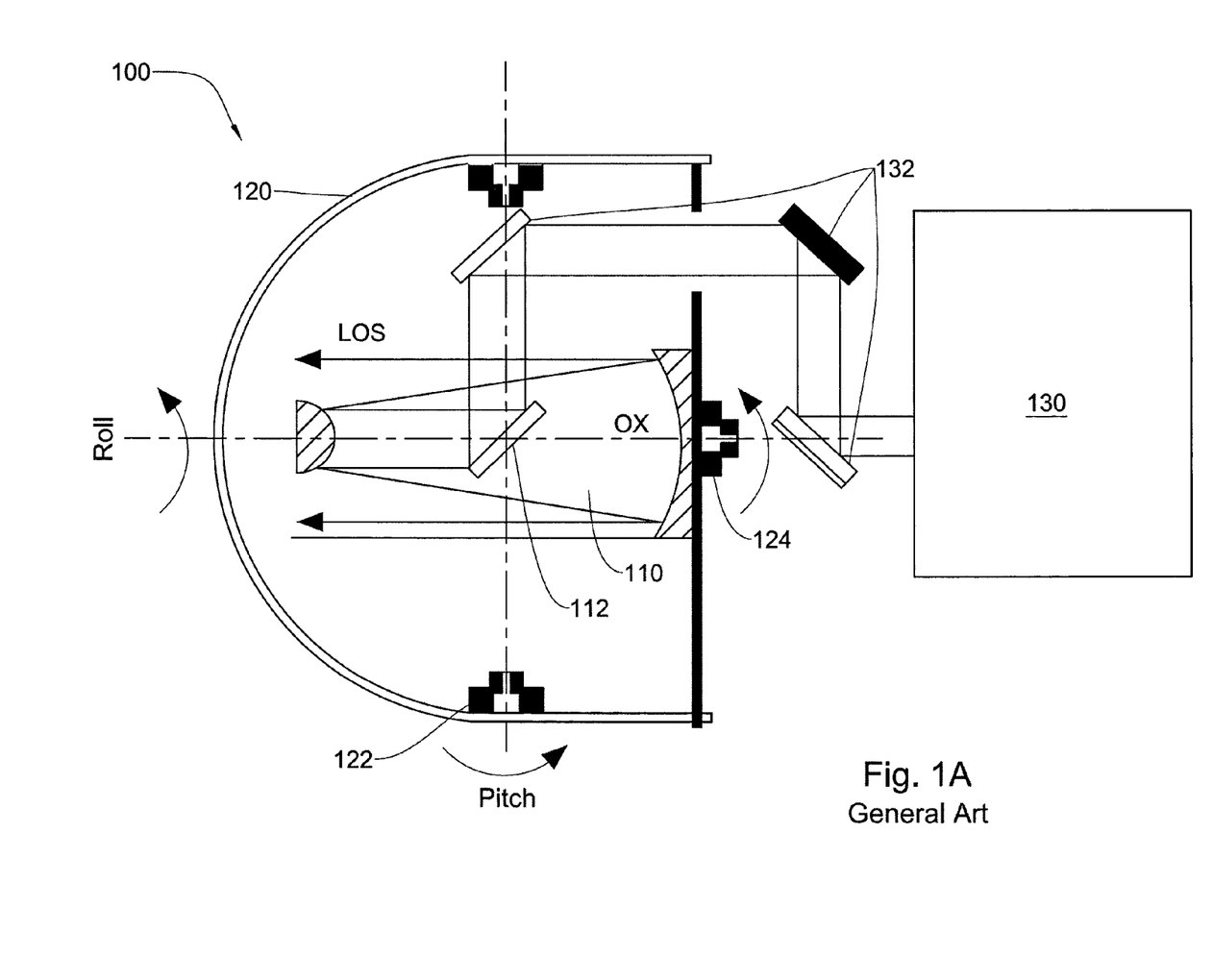
FIGS. 1A and 1B illustrate schematically top and perspective views of a Coudé telescope arrangement.
Figure 1B:
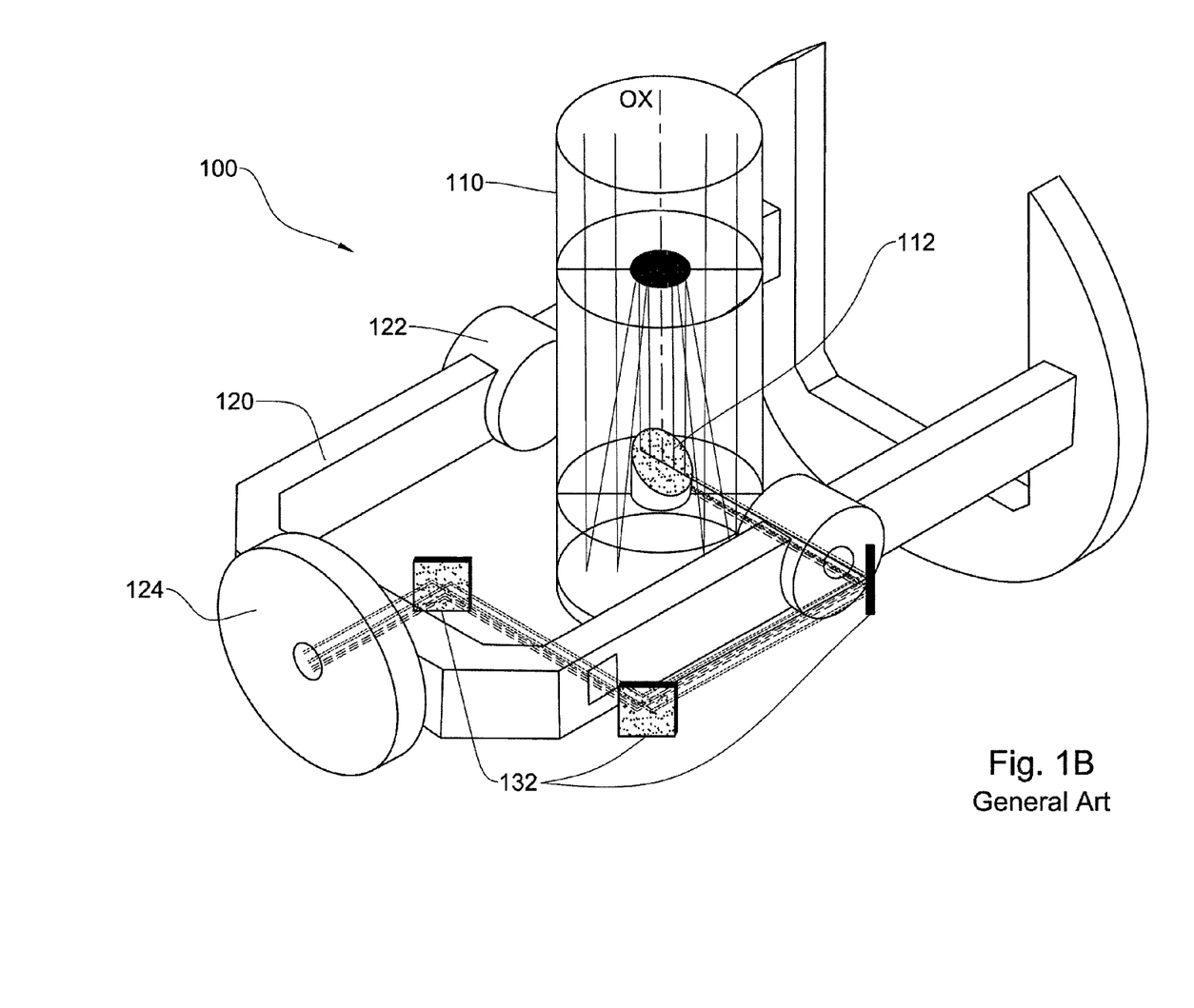

One known arrangement for such line of sight stabilization is commonly known as the Coudé telescope arrangement illustrated for example in FIGS. 1A and 1B. The Coudé telescope arrangement includes a telescope mounted on a stabilization assembly to which a light module receiving or transmitting light to the telescope is attached. The telescope includes a fixed internal mirror intersecting its optical axis inclined with respect thereto. The internal mirror operates to reflect light propagation along the optical axis of the telescope towards a light port of the telescope located alongside its optical axis (e.g. an eye piece can be installed in such a light port when the telescope is not mounted on the stabilization assembly). The stabilization assembly according to the Coudé arrangement includes a set of two gimbals connected to the body of the telescope, allowing its rotation about a pitch and roll direction being respectively a direction perpendicular to the telescope optical axis and a direction perpendicular to the pitch direction. The light module is mounted outside the gimbals and a set of mirrors, located on the roll gimbal, are arranged to provide optical coupling between the light port of the telescope and the light module.

Providing sustainable optical coupling between the telescope and the light module in various orientations of the telescope is obtained by setting the light port of the telescope in optical alignment with the pitch axis of the pitch gimbal such that the direction of light propagating therethrough is not affected by rotation of the telescope about the pitch axis. Additionally, an optical alignment between an optical port of the light module and the roll axis of the roll gimbal is set such that the direction of light propagating from the mirrors on the pitch gimbal towards the optical port is not affected by rotation of the pitch gimbal about the roll axis. Accordingly, optical coupling between the light module and the telescope is maintained while the orientation of the telescope can be changed relative to the light module.

Another example of a line of sight stabilization system is disclosed for example in US patent publication No. 2006/017816. In this publication, a line of sight stabilization system is described using two mirrors pivotally mounted to a fixed platform that can be used with existing imaging systems to provide pitch, roll, and yaw compensation while maintaining image orientation. By deflecting only the photons, the inventive system avoids the need to stabilize the entire imaging sensor and optics system. The only mass to move is that of the two imaging system mirrors. By monitoring attitude changes via an inertial measurement system, platform positions can be estimated for subsequent image acquisitions, and efficient mirror positioning can provide optimal image orientation and stabilization. This approach requires small motors with low torque, providing a less costly, lightweight, and small image orientation and stabilization system.

GENERAL DESCRIPTION

There is a need in the art for a novel line of sight stabilization system and method allowing small dimensions of the line of sight stabilization. Also, there is a need in the art for a compact line of sight stabilization system that is adapted for stabilizing the line of sight of a light module (such as imager) being defined by an optical module (e.g. telescope/optical assembly) optically coupled with the light module. Moreover there is a need in the art for a line of sight stabilization system capable of reorienting the line of sight of the light module while not reorienting the light module.

The term line of sight (LOS) is used for the purposes of the present application to designate the direction to a region(s) of a scene or of environment that is (or can be) perceived/sensed/projected-on by the light module. When a light module is optically coupled with an optical module (e.g. via the line of sight stabilization system), its LOS is actually associated with the field of view (FOV) of the optical module (the LOS of the light module is generally a direction within the FOV of the optical module) and is thus associated with the orientation of the optical module with respect to the scene/environment. The LOS of the light module is considered herein similar to the LOS of the stabilized optical system. Accordingly, the orientation of the LOS is considered herein as the direction/orientation of the line of sight with respect to the environment/scene that is perceived/projected-on by the light module. To discriminate, the term angular position of the optical system/optical module is used herein to designate the relative angular position between the principal optical axis of the optical module and the principal optical axis of the light module.

Stabilization systems are widely used today in various applications to enable orienting the LOS of light modules (such as a light source or light detector) while not requiring reorientation of the light module itself with respect to the environment. In many cases light modules are cumbersome or are mounted on a platform/fixture while it is desirable to allow adjustable/variable orientation of the LOS of the light module that can be varied with respect to the platform/fixture on which the light module can be fixed.

In some cases the LOS of the light module needs to be stabilized against movements/vibrations of the platform to which the light module is mounted and in order to compensate for such movements and to retain stable line of sight of the light module. For example stabilizing the LOS of the light module may be used to maintain a stable image on an imager of the light module; or to stabilize the orientation of a light beam originating from a light source of the light module and emanating from the optical module. Stabilization of the LOS can be achieved by varying the angular position between the light module and the optical module such as to compensate for movements of the light module and/or of the platform to which it is mounted.

Alternatively or additionally, in some cases the LOS of the light module needs to be varied independently of the orientation of the light module, e.g. the light module may be fixed to a platform which may be moving or not with respect to the environment while the LOS of the light module/optical system can be directed to different orientations to capture different regions of the environment. This permits directing/scanning/projecting light to/from the different regions of the environment by controlling the relative angular position between the optical module and the light module and without necessitating reorientation of the light module itself. Accordingly it allows exposing the optical module to a broader view angle without redirecting it.

One of the deficiencies of known line of sight stabilization systems is that such systems are typically large and/or cumbersome and substantial space/volume is required for their accommodation. For example, line of sight stabilization systems in which the entire optical system (e.g. including the light module/imager and the optical module/telescope) is mounted on gimbals typically include sufficiently large gimbals capable for carrying the entire optical system. Moreover such line of sight stabilization systems and also line of sight stabilization systems in which only the optical module is mounted on the gimbals generally utilize two axis gimbals allowing rotation and orientation of the line of sight about two axes. Accordingly the volume required for accommodation of such line of sight stabilization systems should be large enough to allow rotation of the entire optical system (or of at least the optical module in the latter case) about at least two rotation axes. This restricts use of such stabilization systems for controlling the LOS of optical devices mounted on small platforms such as helmet/head-set and small aerial platforms.

Moreover, another deficiency of many of the known line of sight stabilization systems is that utilizing such stabilization systems for varying the orientation of the LOS of the light module (which is optically coupled to the stabilization system), often effects a twist in the orientation of a light beam with respect to its direction of propagation as it passes through a designated optical path at the stabilization system. Accordingly, in certain cases the light module includes an imager module; variation of the LOS captured by the imager may also cause rotation of the image about an axis perpendicular to the imaging screen/sensor of the imager (on/by which the image is formed). Additionally when the light module includes a light source generating light beam having a non isotropic cross-sectional structure, variation of the LOS of the light source (toward which the light beam is directed) would also affect in such cases the orientation of the cross-sectional structure of the light beam.

Many techniques following the Coudé approach utilize an angular rotation about a combination of the roll axis and additional axis (e.g. pitch or yaw). The roll axis is considered herein as an axis being parallel to nominal direction of the optical axis of the optical module. However, resorting to varying the relative angular position between the optical system and the light module about the roll axis, effects a twist in the orientation of the light beam as described above.

The inventors of the present invention have found that a line of sight stabilization system having substantially smaller dimensions and smaller form factor can be obtained by utilizing a single external axis gimbal (i.e. located outside the optical module) and a rotatable mirror (also referred to as internal mirror). The internal mirror is located within the optical module intersecting its optical path and is mounted for rotation about an axis perpendicular thereto (e.g. mounted on an internal gimbal/rotation-axis located within the optical module); and the single external axis gimbal interconnects the optical system and the light module and allows relative rotation between them about an axis perpendicular to both the optical axis of the optical system and also perpendicular to the rotation axis of the internal mirror.

The configuration of the line of sight stabilization system according to the invention allows a small form factor of the system to be achieved which is advantageous in many applications, such as head mounted imagers and missile technology. The small form factor is, inter alia, achieved according to the invention by utilizing only one gimbal that is located externally to the optical system and that permits orientation of the optical module about only one axis. Small form factor is therefore obtained because the single external gimbal (external to the optical system) by itself occupies less space than the conventional configuration in which two external gimbals are used for mounting the optical system. Also since the single external gimbal according to the invention permits reorienting the optical system with respect to only one rotation axis (e.g. the pitch or yaw axes), the effective volume that is required to accommodate the optical system in its various possible orientations is reduced. Reorienting the line of sight about a first axis is provided utilizing the internal mirror which might be entirely accommodated within the optical system and which thus does not require any additional space for its accommodation. The mirror is rotatable about an axis perpendicular to that of the gimbal's axis such as to provide reorientation of the line of sight about an axis perpendicular to that provided by the external gimbal on which the optical system is mounted. For example if the gimbal allows orienting the optical system about the yaw axis, the internal mirror is rotatable about the pitch axis.

Another advantage of the line of sight stabilization technique of the present invention is that it allows obtaining line of sight stabilization in a manner that does not affect the orientation/rotation of the image about the roll axis. This is based on the understanding that varying the relative angular position between the light module and the optical system about any two rotation axes (Pitch & Yaw; or Pitch & Roll; or Yaw & Roll) allows reorienting the LOS of the optical module to any direction within a visual sphere.

It should be noted that the principles of the present invention are suitable for use in any electromagnetic radiation generating/directing/detecting system, where the spectral range of the radiation is not limited to that typically termed "optical". More specifically, the invention is used with optical systems, and is therefore described below by the commonly used terminology. However, in the scope of the present invention the term light should be construed in it broadest interpretation as relating to electro-magnetic (EM) radiations in various wavelength regimes and may include for example electro-magnetic radiation in the visible regime (visible light), the infra-red (IR) regime (e.g. near-, mid- and far-IR regimes) and ultra violet regime as well as EM radiation in the radio frequency (RF) and microwave regimes. Accordingly the terms optics, optical elements and the like should be interpreted as any elements/modules which are capable of manipulating/affecting the propagation of light in its various regimes. Optics and optical elements may for example include diffractive/refractive/reflective elements such as conventional mirrors and/or lenses. Alternatively or additionally the terms optics, optical elements may also include other types of elements (e.g. electronic or electro-optic elements) which are capable of manipulating the direction of EM radiation in the desired wavelengths for example by induction of suitable electromagnetic fields along the optical path of radiation propagation.

Hence, according to a broad aspect of the present invention, there is provided an optical system including a light module, an optical module defining an optical axis and optically coupled with the light module, and a stabilizer assembly including an internal radiation deflector (e.g. mirror) that is located on the optical axis of the optical module in an optical path of light propagating therethrough. The internal mirror is mounted for rotation about a first rotation axis interconnecting the optical module and the internal mirror and being substantially orthogonal to the optical axis of the optical module.

The internal mirror is generally located internally to the optical module and is configured and operable to provide optical coupling between at least a section of the optical path of the optical module and an optical path of the light module. The first rotation axis is internal to the optical module and is configured for providing for relative rotation between the internal mirror and the optical module. Such rotation of the internal mirror varies with the section of the optical path of the optical module which is coupled with the optical path of the light module and thereby affects a variation of the direction of the line of sight of the light module while not affecting a change to the orientation and/or to the angular position between the light- and the optical-modules.

It should be understood that the configuration of the stabilized optical system of the invention allows stabilizing the line of sight of the light module in the direction of the first rotation axis. This can be achieved by rotation of the internal mirror about the first rotation axis in a direction opposite to the direction in which the orientation (rotations) of the stabilized optical system is changed with respect to an axis parallel to the first rotation axis, i.e. compensation to a rotation of the optical system about the first rotation axis in the first direction can be compensated by counter (opposite) rotation of the internal mirror. This allows stabilizing at least one of an image or a light beam formed by the light module.

Line of sight stabilization in a second direction is achieved, according to some embodiment of the invention, by configuring the stabilizer assembly to include a gimbal assembly including an external gimbal that is interconnected between the optical module and the light module. The external gimbal is configured to provide rotation of the optical module, with respect to the light module, about a second rotation axis (the second rotation axis being typically orthogonal to both the optical axis of the optical module and to the first rotation axis and is at least non parallel thereto). Compensation for rotation of the stabilized optical system in a direction parallel to the second rotation axis is therefore possible by applying counter (opposite) rotation to the optical module, about the second rotation axis) with respect to the light module. This allows stabilizing the line of sight of the light module in this direction and to thereby stabilize at least one of an image or a light beam formed by the light module.

It should be understood that alternatively or additionally according to some embodiments of the invention, the internal mirror can be oriented with respect to two rotation axes. For example, the internal mirror can be mounted on a rotation mechanism such as a spherical bearing allowing its orientation of be varied with respect to two axes (i.e. being the first and second axes) that are not parallel to the optical axis of the optical module.

Accordingly, in these embodiments, line of sight stabilization with respect to these two axes can be obtained by only reorienting the internal mirror about these two axes and without utilizing any external gimbal. Accordingly, line of sight compensation is performed, internally to the optical module, in two directions. This allows maintaining a fixed angular position between the optical module and the light module (thus obviating a need for the external gimbal). Also such configuration further reduces the form factor (the size/dimensions) of the stabilized optical system as well as its weight. In this regard, it should also be understood that in these embodiments, compensation for changes of the orientation of the stabilized optical system with respect to both the first and the second rotation axes is performed in a manner that is similar to the manner in which light of sight compensation is performed with respect to the first rotation axis, as described above and also further below with regard to embodiments in which the internal mirror is rotatable only with respect to the first rotation axis.

It should be noted that by utilizing an external gimbal, the angular position (the relative orientation between the optical module and the light module may be changed within an angle of at least 160° with respect to the second rotation axis. Accordingly it allows changing the orientation of the line of sight of the light module by the same angle (160°) or above with respect to the second rotation axis. Changing the orientation of the line of sight (LOS) of the light module by rotating the internal mirror about the first rotation axis (and possibly also about the second rotation axis) allows varying the line of sight (LOS) orientation within an angle of about 90° and more with respect to the first axis (and respectively also with respect to the second axis in embodiments in which the internal mirror is rotatable about this axis).

It should be noted that according to some embodiments of the invention the first rotation axis corresponds (e.g. is parallel) to the pitch rotation axis of the optical module. The second rotation axis corresponds to a yaw axis of the optical module. It should also be noted that the terms rotation axis (e.g. first and second rotation axes) generally designate virtual axis of rotation, not necessarily the physical rotation mechanism associated therewith (which may be implemented by various elements such as a spherical bearing an actual axis/shaft etc.).

According to some embodiments of the invention, in the stabilized optical system, the optical module includes a telescopic mirror arrangement including at least primary and secondary mirrors arranged such that their respective optical axes substantially coincide with the optical axis of the optical module. The internal mirror is located/mounted for intersecting a section of the optical path of the optical module that is defined by the secondary mirror. The internal mirror is, in this case, arranged to optically couple that section of the optical path with an optical path of the light module. Accordingly, rotation of the internal mirror with respect to the telescopic mirror arrangement varies a location of a region on the secondary mirror that is optically coupled with the optical path of the light module thereby varying the section of the optical path coupled with the optical path of the light module. Allowing the mirror to rotate about two rotation axes (e.g. utilizing spherical bearing) allows utilizing the movement of the internal mirror to stabilize the line of sight in two directions. Alternatively, by mounting the mirror for rotation only about a single axis (the first rotation axis) allows stabilizing the line of sight in one direction by utilizing the mirror (stabilizing the line of sight in another direction can be obtained by an external gimbal, as described above).

It should be understood that in the various embodiments of the invention the light module may include one or more light sensors (e.g. one or more imaging sensors having multiple light sensitive pixels). The one or more light sensors may include light sensors sensitive to light in two or more different spectral ranges (e.g. light sensors sensitive to light the IR and the visible spectral ranges respectively). In such an embodiment, the light module may include one or more wavelength selective splitters (dichotic mirrors) configured for spatially separating light, arriving from the optical module, into at least two light components and directing the two components to the different light sensors. In cases where the light module includes light sensor(s), the internal mirror is configured and operable to collect light portion(s) propagating thereto from a certain section of the optical path of the optical module and to direct the collected light portion to the light module.

Alternatively or additionally, according to some embodiments of the invention, the light module includes one or more sources of EM radiation (light). The optical module is then optically coupled with the EM radiation source(s) for collecting and directing an EM radiation beam emitted therefrom. The stabilizer is then configured to enable directing the EM radiation beam to various directions with respect to the light module. EM radiation source(s) may include for example a laser source (in which case the optical module includes an arrangement of optical elements adapted for directing electromagnetic radiation in wavelength range of the laser source) and/or it may include a source of radio frequency (RF) radiation in which case the optical module may include an arrangement of elements adapted for directing electromagnetic radiation in the RF regime such as an arrangement of one or more antennas.

It should be noted that generally the light module includes one or more light guiding elements that are configured and operable to define an optical path of the optical module and to provide optical coupling between a light sensor or light source of the light module and the internal mirror. Such light guiding elements may include for example light deflector(s) (mirrors), lenses, waveguides and also other optical elements. The light guiding elements are arranged and are configured and operable for providing optical coupling between the internal mirror and at least one of a light sensor and light source of the light module while the internal mirror and/or the optical module are in various angular positions with respect to the light module.

According to some embodiments of the present invention the stabilized optical system also includes a stabilization control module. The stabilization control module includes at least a first actuation unit connected to the first rotation mechanism associated with the internal mirror (e.g. to the first rotation axis) and configured to actuate a first relative rotation between the optical module and the internal mirror. The first relative rotation may be restricted to rotation about the first rotation axis (in cases where the internal mirror's rotation is restricted to one direction) or it may be a rotation with respect to any one or both of the first and second rotation axes (e.g. in cases where the internal mirror is mounted on a spherical bearing). Optionally, in cases where the external gimbal is used for providing rotation of the optical module about the second rotation axis, the stabilization control module includes also a second actuation unit that is connected to the external gimbal. The second actuation unit is configured to actuate a second relative rotation between the optical module and the light module about the second rotation axis. Additionally, the stabilization control module includes a control unit that is connected to the first and second actuation units and adapted to be responsive to signals, indicative of rotation rates of the stabilized optical system, to operate at least one of the first and actuation units to perform at least one of the first and second relative rotations and to thereby compensate for changes in the orientation of the stabilized optical module (for the rotation rates) and to thereby stabilize the line of sight of the stabilized optical system.

According to a further embodiment of the invention, the stabilized optical system also includes a rotation rate measurement system that is connectable to the control unit and is configured and operable for measuring the rotation rates of the stabilized optical system with respect to at least one of the second and the first rotation axes, and generating the signal indicative of the rotation rates.

It should be noted that the stabilized optical system may operate as a light source and/or light detector and may be adapted to function for light projection, for imaging and/or as a light transceiver e.g. for operating as a radar. In the former case, the optical module may include, for example, conventional lenses/mirrors while in the latter case it may alternatively or additionally include an array of antennas that are electronically and spatially arranged to define an optical path of light propagation therefrom and/or light reception thereby. Accordingly, the light module may include any one of an electromagnetic radiation source(s) (e.g. a laser source/RF source) and may also, alternatively or additionally, include one or more light sensitive elements/sensors such as a light intensity/chrominance detector, quadrant detector and imaging sensor(s)/detector(s).

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

FIGS. 1A and 1B illustrate schematically top and perspective views of an example of a known arrangement of a line of sight stabilization system commonly known as the Coudé telescope arrangement 100. The Coudé telescope arrangement 100 includes a mirror telescope 110, a light source unit 130 (or an imaging unit) and gimbals set 120 with two gimbals 122 and 124 on which the mirror telescope 110 is mounted. The two gimbals 122 and 124 allow rotation of the mirror telescope 110 with respect to the light source unit 130 about pitch and roll rotation axes in a pitch over roll configuration. The pitch and roll rotation axes are respectively an axis perpendicular to the principal optical axis OX of the mirror telescope 110 and an axis which is generally parallel to the nominal direction of the optical axis OX of the mirror telescope 110. A set of mirrors 132 is arranged with fixed positions and orientation with respect to the light source 130 and is configured for collecting light from the light source 130 and directing that light towards a mirror 112 of the mirror telescope 110 which is located intersecting the optical axis OX of the mirror telescope 110 with fixed position and orientation with respect to the mirror telescope 110.

Figure 2A:
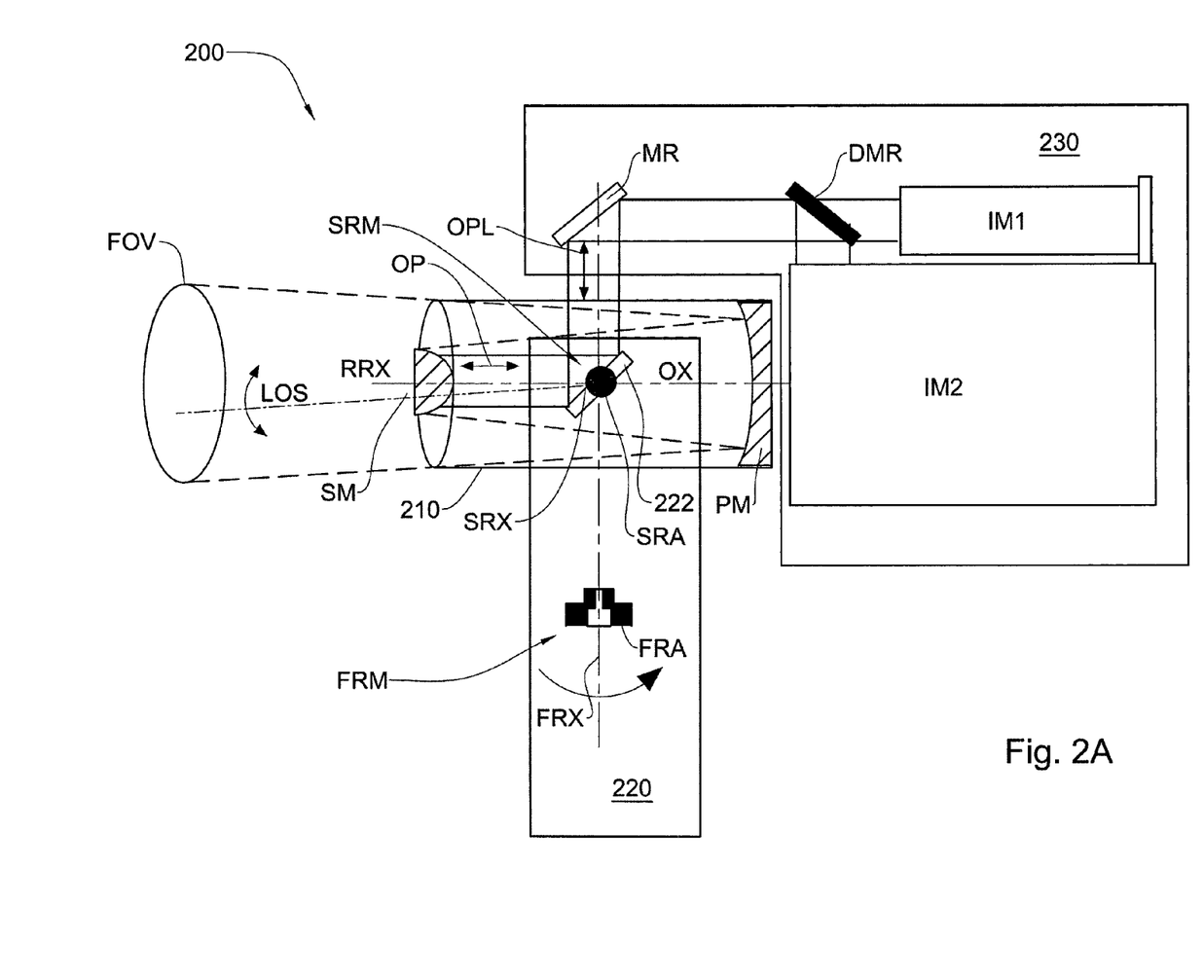
FIGS. 2A and 2B illustrate schematically side and perspective views of a stabilized optical system 200 according to the invention allowing line of sight optical stabilization.
Figure 2B:
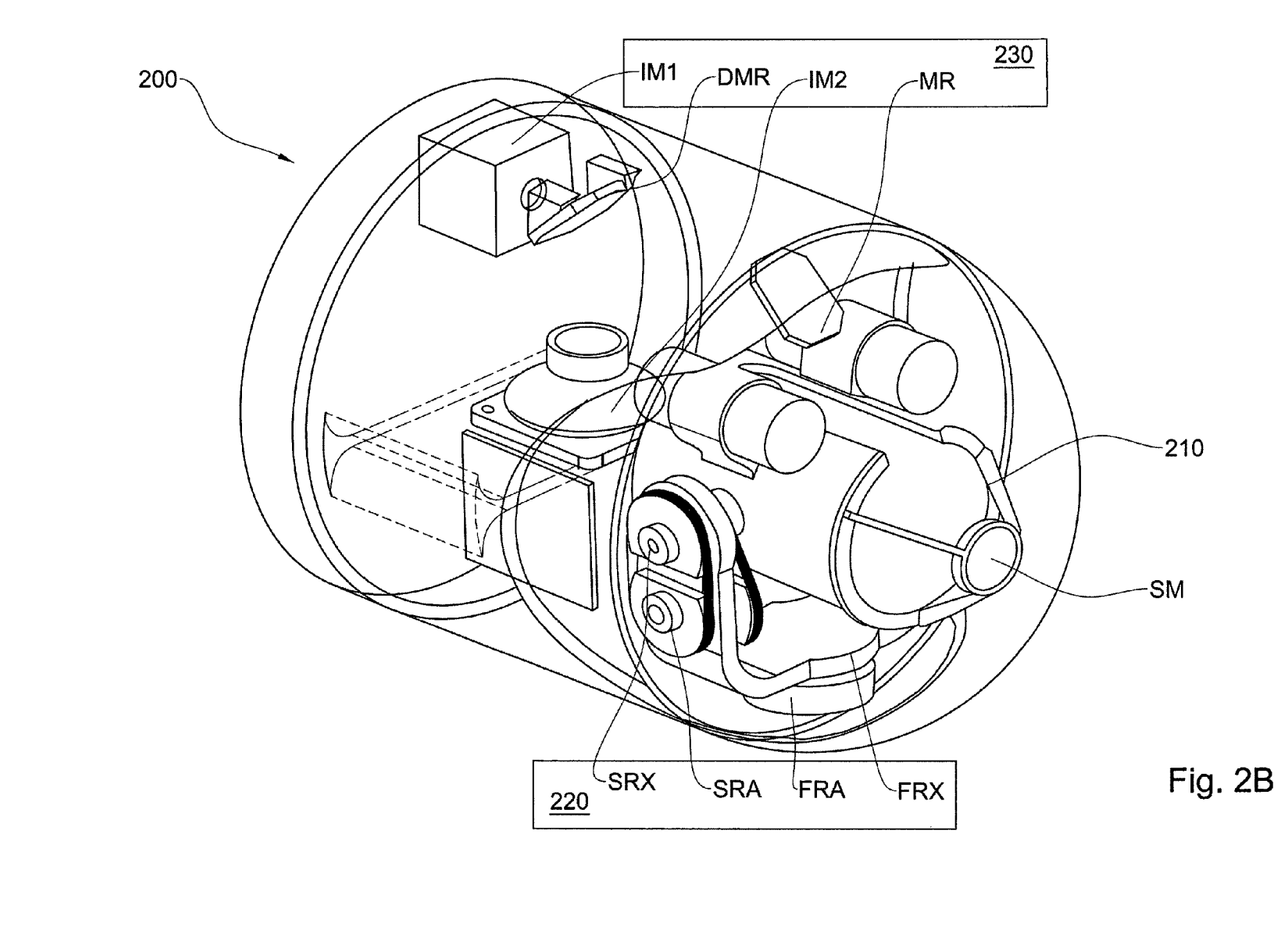

Reference is made to FIGS. 2A and 2B illustrating schematically side and perspective views of a stabilized optical system 200 according to the present invention. The stabilized optical system 200 includes a light module 230, an optical module 210, optically coupled with the light module 230 and a stabilizer assembly 220.

The stabilizer assembly 220 also includes an internal light deflector 222 (e.g. internal mirror) that is mounted within the optical module 210, therewithin, intersecting an optical axis OX of the optical module 210. The internal mirror 222 is pivotally mounted to the optical module 210 via a first rotation mechanism FRM (e.g. a shaft, a bearing or other mechanism) allowing rotation of the internal mirror 222 about a first rotation axis FRX which is perpendicular to the second rotation axis SRX and to the optical axis OX of the optical module 210. The stabilizer assembly 220 interconnects the optical module 210 and the light module 230 via a second rotation mechanism SRM (generally gimbal, e.g. implemented as a shaft, a bearing or other mechanism) which is configured and operable to change the relative angular position between the light module 230 and the optical module 210 with respect to a single rotation axis referred to herein as a second rotation axis SRX. It should be noted that generally the second rotation axis SRX is associated with a gimbal (e.g. a rotation mechanism) that is external to the optical module 210. The first rotation axis FRX is located according to the present invention internally to the optical module 210 thus allowing accommodation of the stabilized optical system 200 within smaller spaces/enclosures.

The optical module 210 is associated with a certain field of view (FOV) designating the extent (region/area) of the observable world that is "seen"/"captured" by the optical module 210. The optical axis OX is an axis traversing through the optical module towards the center of its FOV and designates the general direction of light propagation through an optical path OP of the optical module 210. The light module 230 is associated with an optical path OPL which is optically coupled with a part/portion/section of the optical path OP of the optical module 210 via the internal light deflector 222. A line of sight (LOS) of the light module 230 is generally associated with the FOV "seen" by the optical module 210 and with the part/portion/section of the optical path OP of the optical module 210 which is optically coupled to the optical path OPL of the light module 230.

To this end it should be understood that the light module 230 is associated with a line of sight (LOS) designating the principal direction (the direction within the FOV of the optical module 210) which is "seen"/"captured" by the light module 230. For example the LOS of the light module 230 designates the direction from the stabilized optical system 200 to the region of the environment captured at the center of an image formed on an image sensor of the light module 230, or alternatively it designates the direction in the environment towards which a chief beam that emanates from the light module 230 is directed by the optical module 210.

The LOS of the light module 230 can be controlled according to the invention by utilizing two mechanisms, SRM and FRM, respectively allowing to shift/rotate the LOS about two perpendicular directions. It should be also noted that the first and second rotation mechanisms FRM and SRM may include or may be associated with respectively first and second actuators such as motors (not specifically shown) that are arranged on the stabilizer assembly. The first and second rotation actuators are respectively associated with/connected to the first and second rotation axes FRX and SRX and are configured and operable for inducing rotations between the optical module 210 and the internal mirror 222 and between light module 230 and the optical module 210. Such rotations are induced, for example, in response to control signals transmitted/fed to the rotation actuators.

For clarity and without loss of generality, the two perpendicular directions about which rotation is provided by the two rotation mechanisms (FRM and SRM) are referred to herein respectively as the elevation direction (associated with the elevation angle of the LOS with respect to the first rotation axis FRX, e.g. pitch rotation axis) and the heading direction (associated with the heading angle of the LOS with respect to the second rotation axis SRX, e.g. yaw rotation axis). The first rotation mechanism FRM implements/allows rotation of the internal mirror 222 about the first rotation axis FRX within a predetermined angular range with respect to the optical module 210. Accordingly, the first mechanism FRM permits shifting the elevation angle of the LOS of the light module 230 with respect to the FOV of the optical module 210 without movement/rotation of the optical module 210 in this direction. The second mechanism SRM implements rotation of the optical module 210 (together with the internal mirror 222 mounted thereon) about the second rotation axis SRX and thus allows shifting the heading direction of the FOV of the optical module 210 in that direction (the LOS of the light module 230 inherently rotates in that direction together with the FOV).

More specifically, in the present example, the internal light deflector 222 is arranged and configured for optically coupling at least a portion of the optical path OP of the optical module 210 with an optical path OPL of the light module 230 (or alternatively with an optical pass that is defined by the stabilizer assembly 220 which is not specifically illustrated in the present example). The internal mirror 222 is located at the intersection of the first and second rotation axes FRX and SRX and the optical axis OX of the optical module 210 (about which the optical path OP of the optical module 210 is defined). The internal mirror 222 and the optical module 210 are rotatable together about the second rotation axis SRX for shifting thereby the orientation of the line of sight of the light module with respect to the second rotation axis SRX (the first rotation axis FRX is maintained perpendicular to the axes SRX and OX while the optical module 210 is in various angular positions with respect to the light module 230). Rotation of the optical module 210 about the second rotation axis SRX allows changing the orientation of the LOS of the light module within an angle of about 160° or more with respect to the second rotation axis.

Changing the orientation of the line of sight LOS of the light module 230 with respect to the first rotation axis FRX is achieved by changing the orientation of the internal mirror 222 about the axis FRX with respect to the optical module 210. Rotating the internal mirror 222 about the first rotation axis FRX to different angular positions, results in optically coupling, to the optical path OPL of the light module 230, of different directions/regions of the optical path OP of the optical module 210. Consequently, while the internal mirror 222 is in different positions about the first rotation axis, light propagating respectively through different cross-sections of the optical path OP of the optical module 210 is coupled to the optical path OPL of the light module 230 and/or vice versa, light portions which propagated through the optical path OPL of the light module 230 are coupled to the optical path OP and are directed to respectively different directions within the field of view FOV of the optical module 210. Hence, the direction of the LOS of the light module 230, which is bounded within the FOV of the optical module 210, is changed when the orientation of the internal mirror 222 about the first rotation axis FRX is varied. Such rotation of the internal mirror 222 allows changing the orientation of the LOS of the stabilized optical system 200 within an angle of 90° or more with respect to the first rotation axis FRX.

As a result of the above described configuration of the stabilizer assembly 220, while changing the respective angular position between the optical module 210 and the light module 230 by reorienting the optical module 210 with respect to the second rotation axis SRX, optical coupling between of the optical path OP of the optical module 210 and the optical path OPL of the light module 230 is maintained. This is because the internal mirror 222 rotates together with the optical system 210 about the second rotation axis SRX and because the internal mirror 222 intersects both the optical axis OX of the optical module 210 and the second rotation axis SRX. Accordingly, since such optical coupling is maintained, changing the angular position allows changing the orientation of the line of sight LOS of the light module 230 with respect to the second rotation axis SRX without changing the orientation of the light module 230 itself (i.e. by changing the respective angular position between the light module 230 and the optical module 210). Alternatively or additionally, changing the angular position while maintaining the optical coupling also allows to maintain a stable line of sight LOS while compensating for changes in the orientation of the light module 230 with respect to the second rotation axis SRX (and/or also compensating for movements of the light module 230 in a direction perpendicular to the second rotation axis SRX) by affecting counter changes to the angular position.

Also, the internal mirror 222 is configured and operable for optically coupling of light portions from a certain cross-sectional region of the optical path OP with the optical path OPL of the light module 230. For example, the internal mirror 222 collects light from propagating there-towards from a cross-sectional region of the optical path OP and directs the collected light towards the light module 230 and vice versa when light is propagated in the opposite direction. Rotation of the internal mirror 222 about the first rotation axis FRX varies the cross-sectional region of the optical path OP which is optically coupled with the optical path OPL of the light module 230 and thus varies the direction of the LOS of the light module 230 in this direction while not changing the direction of the optical axis OX of the optical module 210. Hence, rotation of the internal mirror 222 about the first rotation axis FRX allows selectively coupling different regions of the FOV of the optical module 210 to the light module 230 (to the optical path OPL) and thus the LOS of the light module is changed. This allows changing the orientation of the LOS of the light module 230 with respect to the first rotation axis SRX neither changing the orientation of the light module 230, nor the orientation of the optical module 210.

Line of sight stabilization (for stabilizing an image or a light beam) can be implemented according to the invention by providing compensation to vibrations/rotations of the optical system 200 about axes parallel to the second and first rotation axes SRX and FRX. Compensating for such rotations of the optical system 200 is performed by inducing respective counter rotation of the optical module 210 and the internal mirror 222 about the second and first rotation axes SRX and FRX. Rotating the internal mirror 222 about the first rotation axis FRX allows compensating for rotations/vibrations of the stabilized optical system 200 about an axis parallel to the first rotation axis FRX and counter rotation of the optical module 210 about the second rotation axis SRX provides compensation for rotation/vibration of the stabilized optical system 200 about an axis parallel to the second rotation axis SRX. This enables provision of stabilized image on imager unit(s) IM1 and IM2 of said light module 230 and also allows stabilizing a light beam emanating through the optical module 210, from light sources (not shown) of the light module 230.

As was also noted above, one advantage of the configuration of the stabilizer assembly 220 according to the invention is that it enables accommodating the entire stabilized optical system 200 within a relatively small volume, e.g. within a small enclosure. This is because the stabilizer assembly 220 according to the invention may include gimbals assembly 225 having only a single external axis (being the second rotation axis SRX) which allows relative rotation between the optical module 210 and the light module 230 only with respect to that single axis. Orientation of the line of sight of the light module about an axis perpendicular to that single axis (i.e. about the first rotation axis FRX) is obtained by rotation of the internal mirror. Accordingly, less space is required for the accommodation of the stabilized optical system 200 since single axis gimbals generally require less space for their accommodation than multi-axes gimbals and because utilizing such a gimbal assembly restricts the angular position of the optical module 210 to rotate about only one axis (SRX).

Another advantage of the stabilizer assembly 220 of the invention stems from the fact that the relative orientations of light with respect to its propagation direction is maintained constant in all possible angular positions between the light module 230 and the optical module 210, i.e. changing the angular position between the light module 230 and the optical module 210 does not effect a rotation (twist) of the light about its propagation direction. Accordingly, when the light module includes an imager that captures an image of the light from the optical module, the orientation of the image (with respect to the axis perpendicular to the image surface) is maintained constant during variation of the respective angular position between the light module 230 and the optical module 210. This is different and advantageous over other stabilization techniques such as the Coudé technique in which the relative orientation between the optical module and the light module about a roll axis perpendicular to the light module effects a rotation of the image about an axis perpendicular thereto.

Preferably according to the present invention, the stabilizer assembly 220 is configured and operable to change the orientation of the optical module with respect to the light module about two axes orthogonal to the nominal line of sight of the optical module, perpendicular to the roll axis RRX of the system. To this end, the roll rotation axis of the stabilized optical system 200 is an axis designating the nominal direction to which the optical module is directed. The second and first rotation axes, SRX and FRX, are two axes perpendicular to the roll axis RRX and to each other.

Typically when the stabilized optical system is installed on a platform, such as an aerial/aerospace vehicle, the roll axis RRX of the stabilized optical system is selected to point to the forward direction being the general direction of the platform's movement (the orientation of the platform with respect to the roll axis is often referred to as the bank angle). The second rotation axis SRX is typically selected as the yaw axis of the platform (the orientation of the platform with respect to this axis is often referred to as the heading angle of the platform). Accordingly, the first rotation axis FRX is typically selected as the pitch axis (designating the elevation angle of the platform).

Hence, another advantage of the optical system of the present invention is that it allows stabilizing the line of sight LOS of the light module against vibration of the platform (i.e. changes in the orientation of the platform/stabilized optical system) with respect to directions perpendicular to the nominal line of sight of the stabilized optical system (e.g. perpendicular to the platform's direction of motion). Such vibrations are compensated directly e.g. compensating for vibration in the platform elevation by rotating the internal mirror 222 about the first (pitch) rotation axis (FRX) and compensating for vibration in the heading of the platform by rotation of the optical module (e.g. telescope) about the second (yaw) rotation axis (SRX).

For clarity, in the following description the second and first rotation axes (SRX and FRX) are sometimes referred to as the yaw and pitch axes. It should be however understood that those axes (SRX and FRX) do not necessarily lie in the respective directions of the yaw and pitch rotation axes of the platform and can be selected to point to another direction (e.g. orthogonal to the roll axis).

In some embodiments of the present invention, as is also illustrated in FIGS. 2A and 2B of the present example, the optical module 210 of the stabilized optical system 200 includes a mirror telescope (telescopic mirror arrangement). The telescopic mirror arrangement includes primary and secondary mirrors (PM and SM) that are arranged with their optical axes substantially coinciding with the optical axis OP of the optical module 210. The primary mirror PM collects/reflects light from/to the environment (light to be imaged by the light module is collected and light emanating from the light module is reflected by the primary mirror PM. The primary PM and secondary SM mirrors are optically coupled such that at least some of the light collected by the primary mirror PM is deflected towards the secondary mirror SM and vice versa. The internal mirror 222 of the stabilization assembly is therefore posed in such embodiments on the optical axis OP of the optical module 210 in between the primary PM and secondary SM mirrors. The internal mirror 222 is arranged and is configured to couple a light portion reflected from a region of the secondary mirror with the optical path OPL of the light module 230 (the coupled light portion may be propagating from or towards the light module 230). Indeed, rotation of the internal mirror 222 with respect to the telescopic mirror arrangement MT (with respect to the optical module 210) changes the region of the secondary mirror SM (the cross-section part of the optical path) from which light portions are coupled with (e.g. collected and directed to) the optical path OPL of the light module 230.

It should be understood that the light module 230 may include any one of an electromagnetic radiation source(s) (e.g. a light source/FM source) such as a laser emitter and may also, alternatively or additionally, include one or more light sensitive elements/sensors such as a light intensity/chrominance detector, quadrant detector and imaging sensor(s)/detector(s). It should be also noted that the light sensors and/or the light sources of the light module 230 may be sensitive to (or may emit) electro-magnetic radiation in various wavelength regimes for example in the visible light regime, infrared (IR) regime, ultra violet regime and also FM/microwaves. Accordingly, optical elements of the optical module 210 and of the stabilizer assembly 220 are not necessarily conventional mirrors and/or lenses and may include elements that are adapted to operate adequately with the wavelength regimes sought. In this regard various types of optical elements may included, such as diffractive elements, electro-optical elements and/or electronic elements which manipulate the direction of light by induction of a suitable electromagnetic field (e.g. causing lensing or other electromagnetic effects).

In the present example the light module includes two imagers IM1 and IM2. One of the imagers IM1 is sensitive to light in the visible regime and includes charge coupled detector (CCD) that includes multiple light sensitive pixels. A second imager IM2 is sensitive to light in the IR regime e.g. it includes a focal plane array (FPA) detector. The light module also includes light guiding elements defining the optical path OPL of the light module 230 and is configured and operable for guiding light propagating in between the internal mirror 222 of the stabilizer assembly and the light source(s)/light sensor(s) (e.g. imagers IM1 and IM2) of the light module 230. In the present example the light guide elements include a mirror MR and dichroic mirror DMR. Mirror MR defines the optical path OPL which is coupled with the internal mirror 222 and is arranged to couple (e.g. deflect) light from this optical path OPL with the dichroic mirror DMR (generally a wavelength selective beam splitter/combiner). In turn, the dichroic mirror DMR splits light to the imagers IM1 and IM2 (or combines light from light sources of the light module 230) in accordance with the respective wavelengths to which the imagers IM1 and IM2 are sensitive (or which the light sources emanate). It should be noted that according to some embodiments of the invention the light guiding elements are obviated altogether and the optical path OPL of the light module 230 is defined by the light sources and/or light sensors (imagers) of the light module 230. Indeed the light module 230 is generally associated with at least one optical path OPL which is directly or indirectly (i.e. via an intermediate optical path defined by the stabilizer assembly) optically coupled with the optical path OP of the optical module 210. The optical path OPL in the present example is defined by the optical elements MR and DMR which are attached/fixed to the light module and are considered herein to be a part thereof.

Figure 3:
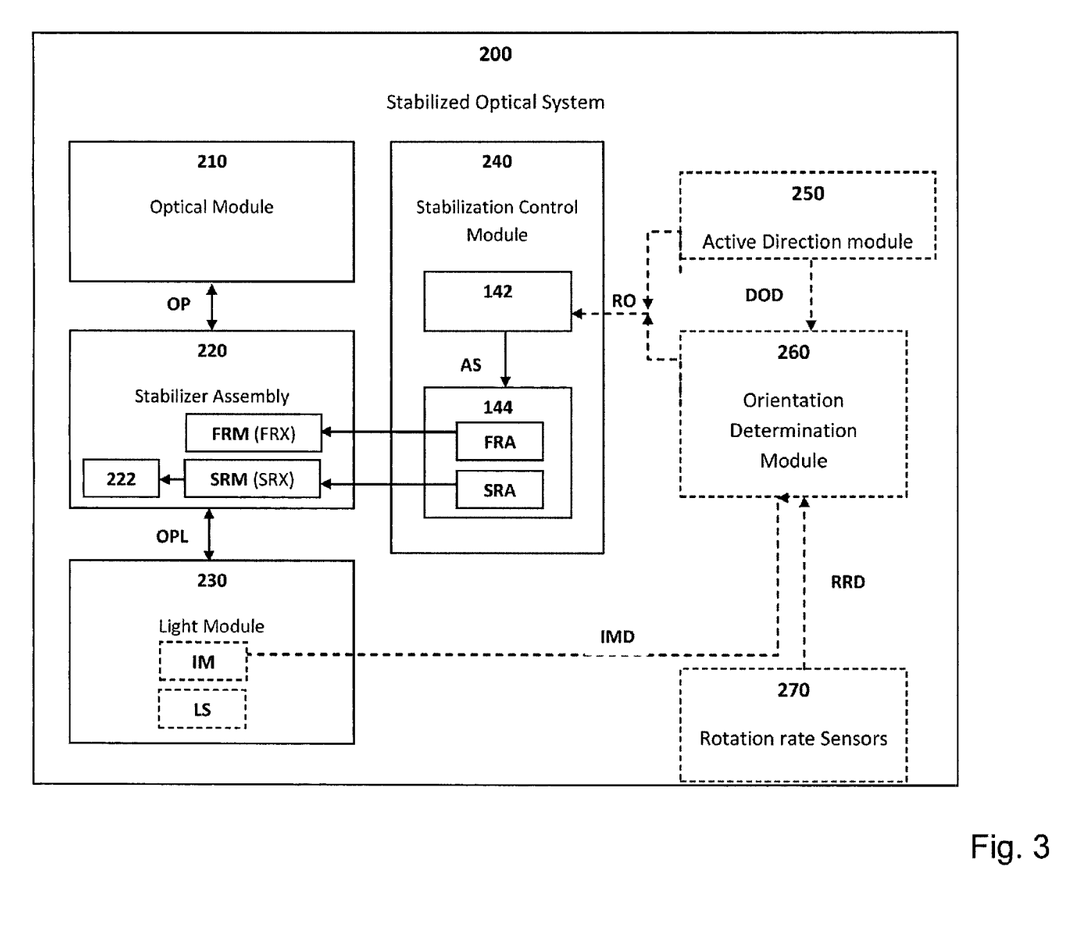
FIG. 3 is a block diagram showing stabilized optical system 200 according to another example of the invention.

Reference is made to FIG. 3 showing a block diagram of the stabilized optical system 200 according to an embodiment of the present invention. Reference numerals similar to those of FIGS. 2A and 2B are used in this figure to designate common elements of the stabilized optical system 200 having similar functionality.

Here, the stabilized optical system 200 includes an optical module 210 and a light module 230 similar to those illustrated in FIGS. 2A and 2B. The optical module 210 and a light module 230 are interconnected and optically coupled with one another via a stabilizer assembly 220 which is similar to that illustrated in FIGS. 2A and 2B and which is configured and operable to enable to vary the direction of the line of sight of the light module 230 by rotating the line of sight about two rotation axes (FRX and SRX in FIG. 2A) that are orthogonal to the optical axis of the optical module 210.

Accordingly and similarly to the stabilizer assembly 220 illustrated in FIGS. 2A and 2B, also here the stabilizer assembly 220 interconnects the optical module and the light module via second rotation mechanism SRM allowing to change their respective angular position about a second rotation axis. The stabilizer assembly 220 includes an internal mirror 222 and a first rotation mechanism FRM. Similarly to the configuration of FIGS. 2A and 2B, also here the internal mirror is located such that it intersects the optical paths OP and OPL of the optical module 210 and light module 230 respectively for providing optical coupling between at least parts of these optical paths OP and OPL. The internal mirror is mounted on the first rotation mechanism FRM and is thus capable to rotate about the first rotation axis. This orientation of the internal mirror 222 with respect to the first rotation axis (FRX in FIG. 2A) controls the parts of the optical paths OP and OPL which are optically coupled together and thus the relative angle between the line of sight (LOS in FIG. 2A) of the light module 230 and the optical axis (OX in FIG. 2A) of the optical module 210.

It should be noted here that the light module may generally include one or more various types of sources and or sensors which are capable of irradiating/emitting and/or detecting/sensing electro-magnetic radiation in various wavelength regimes. The terms electromagnetic radiation and light are used herein interchangeably to designate any type of electro-magnetic radiation in any suitable wavelength/frequency regime which originate or are detected by the light module 230 of the stabilized optical system 200. Applicable wavelength regimes, for which the stabilized optical system 200 of the invention can be designed, may include for example, but are not limited to, the visible light regime, ultraviolet light regime, infrared light (Near-, Mid- and Far-IR) and also radio-frequency and microwave regimes. In this respect the stabilized optical system of the invention may be operated as a stabilized imaging- or light-source-system (e.g. operating within the IR to UV wavelength regimes) and/or it may be a radar/radio transmitter/receiver system operating in the microwave and/or the radio frequency regimes.

It should be noted that in embodiments of the invention in which the stabilized optical system 200 is designed in certain wavelength regime(s), both the light module 230 and the optical module 210 are configured and operable to operate in these regimes. In this respect the optical module 210 and the optical elements included therein are generally configured and operable for transmitting/propagating/directing therethrough light in the desired wavelength regime(s) in accordance with those sensed or emitted by the light module. To this end, optical elements of the optical module 210 may include elements such as mirror, lenses and optically diffractive elements and also electro-optical or electronic elements such as antennas or antenna arrays which are referred to herein also as optical elements. The term optics and optical elements/systems should therefore be construed in the context of the present invention in the broad sense as relating to any elements that are capable of manipulating the propagation on electromagnetic radiation (light).

In this embodiment of the invention, the system 200 also includes a stabilization control module 240 including stabilization controller 242 and actuation module 244. The stabilization controller 242 is configured and operable to receive relative orientation data RO indicative of the desired relative orientation of the line of sight of the light module 230 (e.g. relative to the orientation of the light module 230 itself) and to generate and supplement suitable actuation signals AS to the actuation module 244 which in turn affect actuation of rotation of the first and second rotation mechanisms to the suitable position in which the desired relative orientation of the line of sight of the light module 230 is obtained. To this end the actuation module includes first and second rotation actuators (actuation units), FRA and SRA, (e.g. servos/motors) that are operable for receiving the actuation signals AS from the stabilization controller 242. The first and second rotation actuators, FRA and SRA, are respectively connected to (or are part of) the first and second rotation mechanisms, FRM and SRM, of the stabilizer assembly 220 and are configured to effect rotations of these mechanisms in response to actuation signal AS from the stabilization controller 242.

Generally, the stabilization controller 242 may receive relative orientation data RO indicative of the desired relative orientation of the line of sight of the light module 230 from various types of sources. For example, active direction of the line of sight of the light module 230 can be provided by allowing a user/machine to control the relative orientation between the line of sight and the stabilized optical system 200. In this case for example, relative orientation data RO may be generated by a user (person/computer) of the stabilized optical system 200 by utilizing active direction module 250 which may be optionally associated with the stabilized optical system 200. Active direction module 250 may be for example a user interface module (UI) or an application interface module (API) that provide an interface through which a user or a machine can provide instructions regarding the desired direction of the line of sight of the light module 230.

Alternatively or additionally, in some cases it is desired to utilize the stabilized optical system 200 of the invention for stabilizing an image or a light beam against changes in the orientation/position of the stabilized optical system 200. Hence optionally when image or light beam stabilization is sought, an orientation determination module 260 may be employed to stabilize the image/light beam. The orientation determination module 260 is configured and operable to determine the orientation of the line of sight of the light module 230 (e.g. with respect to the external environment) and/or to determine changes in that orientation and to generate relative orientation data RO that is suited for correcting/compensating for such changes and thus stabilizing the image/light beam. Changes in the orientation of the line of sight may be caused, for example, by vibrations or fluctuations in the orientation/position of the stabilized optical system 200.

To this end, the orientation determination module 260 may be connectable to rotation rate sensor module 270, including one or more rotation rate sensors (e.g. rate gyros) and attached/mounted to the stabilized optical system 200. Rotation rate sensor module 270 measures the rotation rates of the stabilized optical system 200 at least with respect to the first and second rotation axes (FRX and SRX in FIG. 2A) and provides data RRD (rotation rate data) indicative thereof to the orientation determination module 260. In turn, orientation determination module 260 applies integration to the received rotation rates from the rotation rate sensor module 270 and determines a change in the orientation of the stabilized optical system 200 and further determines relative rotation data RO indicative of the rotation that should be actuated by the first and second rotation mechanisms, FRM and SRM in order to compensate for the change in orientation of the stabilized optical system 200 and to maintain a stable line of sight of the light module 230.

As illustrated in FIG. 3, the light module 230 may include a source, LS and/or imaging system(s) IM. It should be understood that, according to the present invention, the orientation determination module 260 is not necessarily associated with rotation rate sensors (module 270). For example, in cases where the light module 230 includes an imaging system IM, changes in the orientation of the stabilized optical system may be determined/calculated based on image data IMD that is indicative of images captured by the imaging system IM. Determining the changes in the orientation of the optical system based on image data can be performed by comparing two or more images from that image data IMD and by utilizing various types of image processing techniques which are known in the art. After changes in the orientation of the stabilized optical system 200 are determined, compensating for such changes by inducing rotation actuation on the first and second rotation mechanisms (by the first and second rotation actuators, FRA and SRA) is performed in a manner similar to that described above.

It should also be noted that the system of the present invention may be configured and operable for concurrently performing both active direction of the line of sight of the light module 230 (e.g. based on user or machine inputs) and concurrently applying line of sight stabilization to compensate for changes in the orientation of the stabilized optical system 200. In such cases the orientation determination module 260 may be configured and operable to receive desired orientation data DOD from the rotation rate sensor module 270 (or alternatively image data IMD from an imager IM of the light module 230) and to process these data pieces to determine the relative orientation (RO data) that should be applied by the first and second rotation mechanisms for both compensating for changes in the orientation of the stabilized optical system 200 and also actively directing the line of sight of the light module to the desired direction.

The invention claimed is:
1. An optical system comprising:
a light module;
an optical module defining an optical axis and an optical path of light propagation therethrough; and a stabilizer configured and operable for providing optical coupling between said optical module and said light module, wherein said stabilizer comprises:

a gimbal assembly defining a first rotation axis orthogonal to said optical axis and comprising a gimbal interconnected between said optical module and said light module and configured to allow rotation of said optical module about a second rotation axis orthogonal to said optical axis and to said first rotation axis; and an internal deflector located in the optical path of light propagating through said optical module, said internal deflector being mounted for rotation about said first rotation axis and configured and operable to provide optical coupling between at least a section of the optical path of said optical module and an optical path of light passing through said light module.

2. The optical system according to claim 1, wherein said internal deflector is rotatable about said first rotation axis thereby varying the section of the optical path of said optical module which is coupled with the optical path of the light module.

3. The optical system of claim 1, wherein rotation of said internal deflector about said first rotation axis in a direction opposite to a direction of rotation of the optical system about an axis parallel to said first rotation axis provides compensation for said rotation of the optical system, thus allowing to stabilize at least one of an image or a light beam formed by said light module.

4. The optical system of claim 1, wherein rotation of said optical module about said second rotation axis with respect to said light module provides compensation for rotation of the optical system in a direction opposite to the rotation of said optical module, thus allowing to stabilize at least one of an image or a light beam formed by said light module.

5. The optical system of claim 1, wherein said optical module comprises a telescopic mirror arrangement comprising at least primary and secondary mirrors arranged such that their respective optical axes substantially coincide with said optical axis of the optical module, said internal deflector intersecting a section of the optical path of the optical module defined by said secondary mirror and being arranged to optically couple said section of the optical path with an optical path of the light module.

6. The optical system of claim 5, wherein rotation of said internal deflector with respect to the telescopic mirror arrangement varies a location of a region on the secondary mirror that is optically coupled with the optical path of the light module thereby varying said section of the optical path coupled with the optical path of the light module.

7. The optical system of claim 1, wherein said light module comprises at least one light sensor having one or more light sensitive pixels; said internal deflector is configured and operable to collect a light portion propagating thereto from a section of the optical path of the optical module and to direct the collected light portion to said light module.

8. The optical system of claim 7, wherein said light module comprises at least two light sensors sensitive to light in at least two different spectral ranges, and at least one wavelength selective splitter configured for spatially separating light from said optical module into at least two light components and directing them to said at least two light sensors.

9. The optical system of claim 8, wherein said wavelength selective splitter comprises a dichotic mirror.

10. The optical system of claim 1, wherein said light module includes at least one source of electromagnetic radiation and wherein said optical module is optically coupled with said at least one source for collecting and directing an electromagnetic radiation beam emitted therefrom; said stabilizer is configured for directing said radiation beam to various directions with respect to said light module.

11. The optical system of claim 10, wherein said at least one source of electromagnetic radiation comprises at least one of the following:

(i) a laser source and wherein said optical module comprises an arrangement of optical elements adapted for directing electromagnetic radiation in wavelength range of said laser source; and (ii) a source of radio frequency radiation, wherein said optical module comprises an arrangement of elements adapted for directing electromagnetic radiation in the radio frequency regime.

12. The optical system of claim 11, said at least one source of electromagnetic radiation comprises a source of radio frequency radiation.

13. The optical system of claim 1, wherein said light module comprises one or more light guiding elements that are configured and operable to define an optical path of said optical module and to provide optical coupling between a light sensor or light source of the light module and the internal deflector, while said optical module and said internal deflector are in various angular positions with respect to said light module.

14. The optical system of claim 1, comprising a stabilization control module comprising:

a first actuation unit connected to said first rotation axis and configured to actuate a first relative rotation between said optical module and said internal deflector about said first rotation axis;

a second actuation unit connected to said gimbal and configured to actuate a second relative rotation between said optical module and said light module about said second rotation axis; and a control unit connected to said first and second actuation units and adapted to be responsive to signals, indicative of rotation rates of said optical system, to operate at least one of said first and second actuation units to perform at least one of the first and second relative rotations, to thereby compensate for said rotation rates and stabilize a line of sight of said optical system.

15. The optical system of claim 14, comprising a rotation rate measurement system connectable to said control unit and configured and operable for measuring the rotation rates of said optical system with respect to at least one of the first and the second rotation axes, and generating said signal indicative of said rotation rates.

16. The optical system of claim 1, wherein said stabilizer and said gimbal are configured and operable to enable a change in orientation of a line of sight of said light module within an angle of at least 160° about said second rotation axis.

17. The optical system of claim 1, wherein said stabilizer, said first rotation axis and said optical module are configured and operable to enable a change in orientation of a line of sight (LOS) of said light module within an angle of at least 90° about said first rotation axis.

18. The optical system of claim 1, wherein said second rotation axis corresponds to a yaw axis of said optical module.

19. The optical system of claim 1, wherein said gimbal is external to said optical module and is configured for providing relative rotation between said optical module and said light module.

20. The optical system of claim 1, wherein said first rotation axis corresponds to a pitch axis of said optical module.

21. The optical system of claim 1, wherein said first rotation axis is internal to said optical module and is configured for providing relative rotation between the internal deflector and the optical module.

* * * * *